(12) United States Patent
Thielman

(10) Patent No.: US 9,272,743 B2
(45) Date of Patent: Mar. 1, 2016

(54) SPHERICAL MODULAR AUTONOMOUS ROBOTIC TRAVELER

(71) Applicant: Gerhard W. Thielman, Fredericksburg, VA (US)

(72) Inventor: Gerhard W. Thielman, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/509,350

(22) Filed: Oct. 8, 2014

(65) Prior Publication Data

US 2015/0021107 A1    Jan. 22, 2015

Related U.S. Application Data

(63) Continuation-in-part of application No. 14/263,529, filed on Apr. 28, 2014, which is a continuation of application No. 13/068,913, filed on May 4, 2011, now Pat. No. 8,768,548, which is a continuation-in-part of application No. 12/386,179, filed on Apr. 10, 2009, now Pat. No. 7,963,350.

(51) Int. Cl.
*G05D 1/08* (2006.01)
*B62D 57/00* (2006.01)
*F03G 3/00* (2006.01)

(52) U.S. Cl.
CPC *B62D 57/00* (2013.01); *F03G 3/00* (2013.01); *G05D 1/0891* (2013.01); *Y10S 901/01* (2013.01)

(58) Field of Classification Search
CPC combination set(s) only.
See application file for complete search history.

(56) References Cited

U.S. PATENT DOCUMENTS

| 1,915,886 | A | 6/1933 | Gutierrez |
| 2,107,766 | A | 2/1938 | Rose ............................. 180/10 |
| 2,267,254 | A | 12/1941 | Reilley ........................ 180/21 |
| 3,350,065 | A | 10/1967 | Monkey |
| 3,428,015 | A | 2/1969 | Cloud ............................ 441/78 |
| 3,905,323 | A | 9/1975 | Kacere ...................... 114/39.23 |
| 4,386,787 | A | 6/1983 | Maplethorpe et al. ........ 280/206 |

(Continued)

OTHER PUBLICATIONS

R. Chase et al.: "A Review of Active Mechanical Driving Principles of Spherical Robots", *Robotics*, Nov. 1, 2012.

(Continued)

*Primary Examiner* — Thomas Tarcza
*Assistant Examiner* — Edward Pipala
(74) *Attorney, Agent, or Firm* — Gerhard W. Thielman, Esq.

(57) ABSTRACT

A spherical modular autonomous robotic traveler (SMART) is provided for delivering a payload along a surface from a first position to a second position. The SMART includes an outer spherical shell for rolling along the surface, an inner spherical chamber within the outer shell to carry the payload, a plurality of weight-shifters arranged in the inner chamber, and a controller to activate a select weight-shifter among the plurality. The weight-shifters can be arranged symmetrically or asymmetrically. The outer shell rolls in a direction that corresponds to the activated weight-shifter by torque induced thereby. The inner chamber maintains its orientation relative to the surface, even while the outer shell rolls along the surface. Each weight-shifter includes a channel containing an armature and an electromagnet activated by the controller. For the symmetrical arrangement, the channel is oriented from bottom periphery to lateral radial periphery of the inner chamber. The electromagnet is disposed proximal to the channel at the lateral radial periphery. The armature travels from the bottom periphery within the channel to the lateral radial periphery upon activation of the electromagnet.

20 Claims, 5 Drawing Sheets

(56) References Cited

U.S. PATENT DOCUMENTS

| | | | | |
|---|---|---|---|---|
| 4,438,588 | A | 3/1984 | Martin | 46/228 |
| 4,729,446 | A | 3/1988 | Sefton | 180/21 |
| 5,439,408 | A * | 8/1995 | Wilkinson | 446/409 |
| 6,056,402 | A * | 5/2000 | Preussner | 351/216 |
| 6,289,263 | B1 | 9/2001 | Mukherjee | 700/245 |
| 6,298,934 | B1 | 10/2001 | Shteingold | 180/10 |
| 7,767,335 | B2 | 8/2010 | Sharrow et al. | 429/156 |
| 7,963,350 | B1 | 6/2011 | Thielman et al. | 180/7.1 |
| 8,210,289 | B1 * | 7/2012 | Lu et al. | 180/7.1 |
| 8,322,471 | B2 | 12/2012 | Schroll | 180/54.1 |
| 8,672,062 | B2 | 3/2014 | Schroll | 180/8.1 |
| 8,768,548 | B2 | 7/2014 | Thielman | 701/22 |
| 2011/0148333 | A1 * | 6/2011 | Umemori et al. | 318/376 |

OTHER PUBLICATIONS

G. C. Schroll: "Dynamic Model of a Spherical Robot from First Principles", Thesis, Colorado State University, Jul. 20103.

* cited by examiner

SPHERICAL MODULAR AUTONOMOUS ROBOTIC TRAVELER

CROSS REFERENCE TO RELATED APPLICATION

The invention is a Continuation-in-Part, claims priority to and incorporates by reference in its entirety U.S. patent application Ser. No. 14/263,529 filed Apr. 28, 2014. That parent application is a Continuation of U.S. Pat. No. 8,768,548, which is a Continuation-in-Part of U.S. Pat. No. 7,963,350.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to autonomous robots. In particular, the invention relates to spherical self-propelled robots for autonomous remote delivery of an enclosed payload.

Autonomous robots have been developed for various purposes, including self-propelled machines designed for locomotion along horizontal and uneven surfaces. Additionally spherical platforms designed for ferrying persons into hostile close-quarter areas for reconnaissance, e.g., U.S. Pat. No. 7,963,350 and for remote-control infrared sensing, e.g., U.S. Pat. No. 8,768,548, have been conceptualized. These involve lower and upper internal carriages equipped with wheels that rotate along an outer shell of the platform to induce vehicle translation along an external surface.

Alternative ball-shaped robots include U.S. Pat. No. 6,289,263 to Mukherjee and U.S. Pat. No. 8,322,471 to Schroll. The former concept provides a central hub with spokes extending radially therefrom and masses that shift along the spokes to shift the robot's moment of inertia for locomotion. The latter concept employs a pair of counter-rotating gyroscopes to imparting momentum to a spherical housing.

SUMMARY

Conventional autonomous robots yield disadvantages addressed by various exemplary embodiments of the present invention. In particular, a spherical modular autonomous robotic traveler (SMART) is provided for delivering a payload to from a first location to a second location along a surface.

Various exemplary embodiments provide a SMART that includes an outer spherical shell for rolling along the surface, an inner spherical chamber within the outer shell to carry the payload, a plurality of weight-shifters arranged in the inner chamber, and a controller to activate a select weight-shifter among the plurality. The outer shell rolls in a direction that corresponds to the activated weight-shifter by torque induced thereby. The inner chamber maintains its orientation relative to the surface, even while the outer shell rolls along the surface. The weight-shifters can be arranged symmetrically or asymmetrically.

In other exemplary embodiments, each weight-shifter includes a channel containing an armature and an electromagnet activated by the controller. For a symmetrical SMART such as a cruciform configuration, the channel is oriented from bottom periphery to lateral radial periphery of the inner chamber. The electromagnet is disposed proximal to the channel at the lateral radial periphery. The armature travels from the bottom periphery within the channel to the lateral radial periphery upon activation of the electromagnet.

Alternate embodiments provide an asymmetrical SMART that incorporate a peripheral weight-shifter including a peripheral channel containing a first armature oriented from a forward periphery of the inner chamber toward a circumferential periphery of the inner chamber; a radial weight-shifter including a radial channel containing a second armature oriented from the forward periphery toward an interior location.

For the alternate embodiments, the weight-shifters further include first and second electromagnets activated by the controller respectively disposed adjacent the circumferential periphery and the interior location. The first armature travels from the forward periphery within the peripheral channel to the circumferential periphery upon activation of the first electromagnet, and the second armature travels from the forward periphery within the radial channel to the interior location upon activation of the second electromagnet.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field-programmable gate array (FPGA) or other related component.

The disclosure generally employs metric units with the following abbreviations: length in centimeters (cm) or meters (m), mass in grams (g) or kilograms (kg), time in seconds (s), angles in degrees (°) or radians (rad), force in newtons (N) and current in amperes (A). Supplemental measures can be expressed derived from these, such as density in grams-per-cubic-centimeters (g/cm$^3$), moment of inertia in gram-square-centimeters (kg-m$^2$) and the like.

U.S. Pat. Nos. 7,963,350 and 8,768,548 represent self-locomotive spherical platforms that employ dual wheeled carriages mounted under and over the payload carriage contained within an outer spherical shell. (The former reference includes description of personnel seated in tandem, whereas this adjective should have been corrected to being abreast.) Exemplary embodiments of the spherical modular autonomous robotic traveler (SMART) incorporate controlled shifts of the center of mass to minimize moving components and thereby enable miniaturization of such a self-propelled device to approximately the size of a croquet ball that has a regulation diameter of 3⅝ inches (9.2 cm). A billiard ball of 5.7 cm (2.244 inches for American pool) could represent an alternative size for such purposes. The SMART can be designed with inertial momentum that is either neutral or biased, depending on static preference of being either stationary or rolling. These alternatives are respectively labeled n-SMART (for neutral) and b-SMART (for biased).

Figure 1:
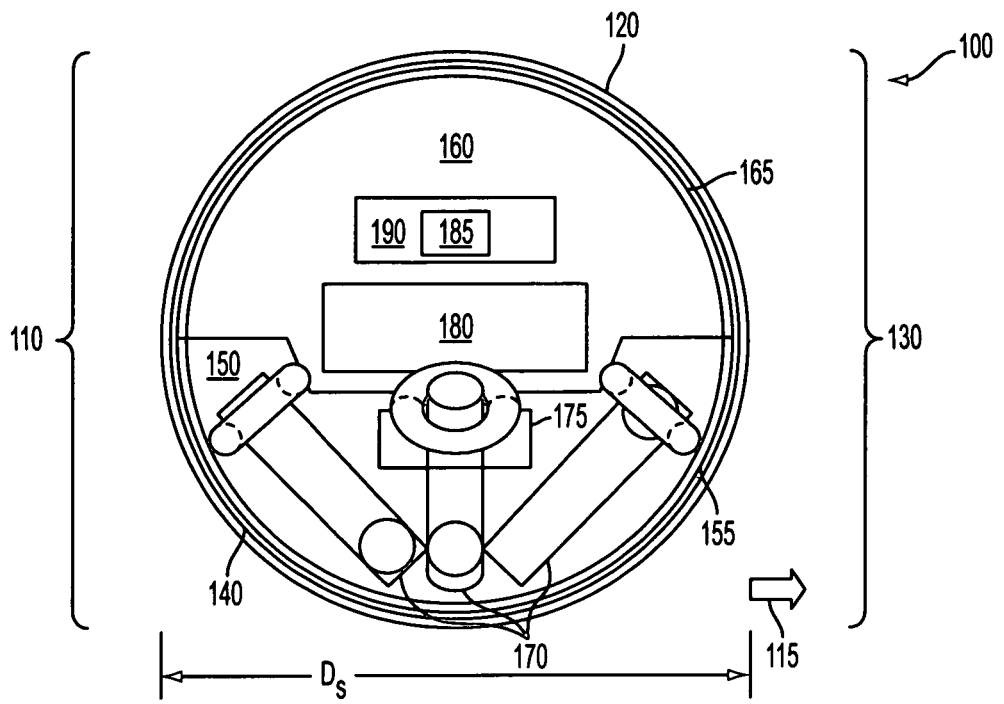
FIG. 1 is an elevation view of a neutral spherical traveler assembly.

FIG. 1 shows an elevation cross-section view 100 of an exemplary neutral SMART 110 for travel in direction arrow 115. An outer shell 120 provides the rolling exterior surface and contains an inner non-rotating ball 130. A lubrication layer 140 interposes between the rolling outer shell 120 and the inertial inner ball 130 to reduce friction. For travel along arrow 115, the outer shell would roll clockwise in view 100. The inner ball 130 includes a lower locomotion module 150 encased by a lower dome 155 and an upper payload module 160 encased by an upper dome 165.

The lower module 150 includes a plurality 170 of weight-shifting modules and a control assembly 175. The upper module 160 includes a designated payload 180, such as an incendiary, explosive or flash-bang charge equipped with a trigger 185 within a housing 190. The outer shell 120 rolls along a smooth frictional surface substantially perpendicular to the local gravitational field, while the inner ball 130 maintains an upright orientation (relative to that field and thereby the surface) during travel of the SMART 110.

Figure 2:
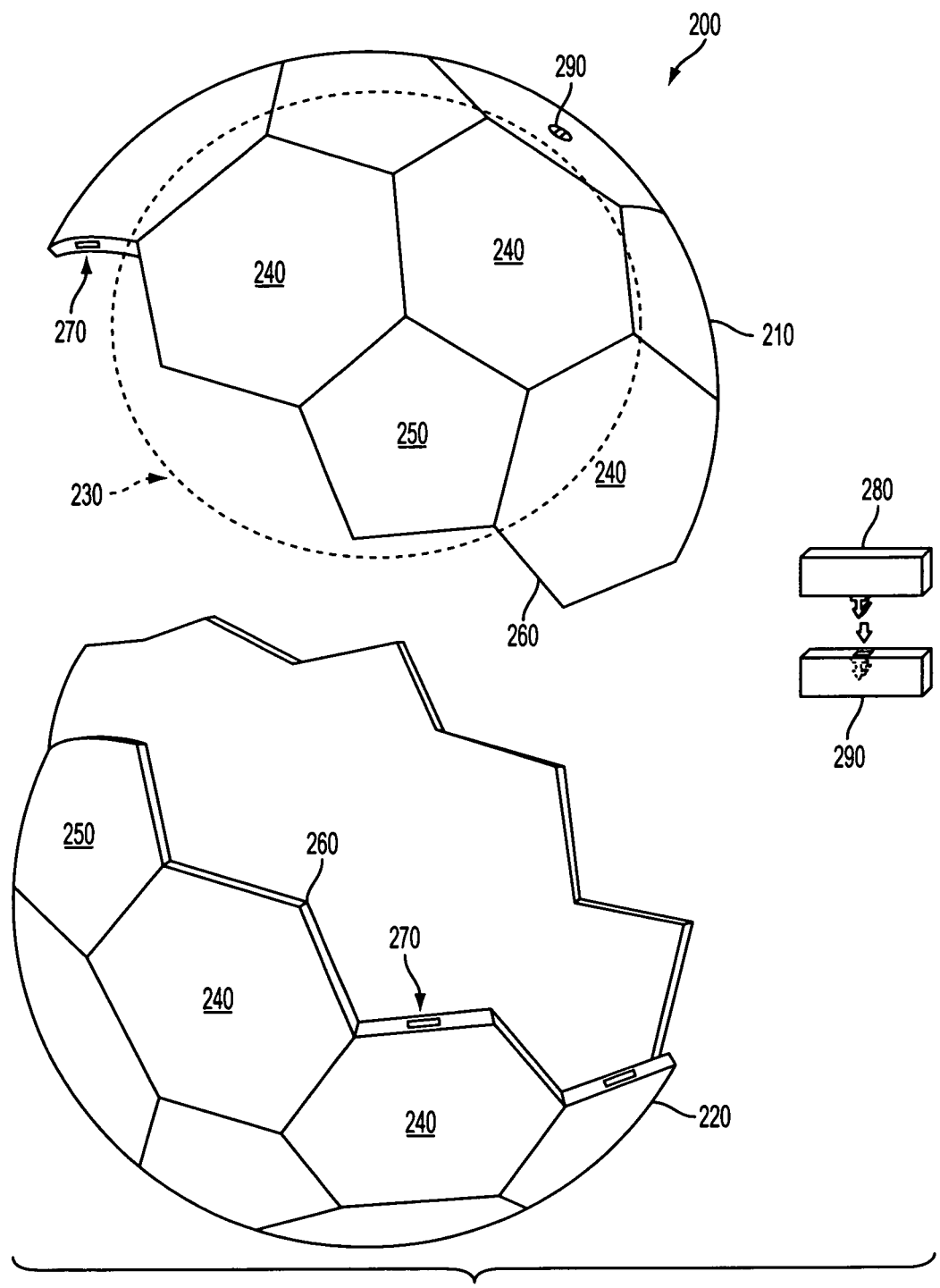
FIG. 2 is an isometric view of outer shell components.

FIG. 2 shows an exploded isometric view 200 of the outer shell 120 that can be divided into first and second domes 210 and 220. The outer shell 120 can exhibit an external geodesic pattern 230 (e.g., soccer ball) and separable along peripheries of the hexagons 240 and/or the pentagons 250, although this example is descriptive only and not limiting. Alternatively, the portions 210 and 220 can be symmetrical to facilitate manufacture. As assembled, the outer shell 120 can be composed of an appropriate material for travel along a floor or ground surface, such as a ceramic (e.g., magnesium fluoride $MgF_2$—density 3.148 g/cm$^3$) or thermoset plastic (e.g., polyethylene terephthalate $(C_{10}H_8O_4)_n$ also known as polyester—density 1.38 g/cm$^3$), as well as possess a smooth interior surface to minimize friction with the inner ball 130.

Interface peripheries 260 of the portions 210 and 220 can include rectangular cavities 270 designed to receive complementary interlocking inserts 280 and 290 (shown enlarged adjacently) that can be sufficiently flexible to enable a tang of the male insert 280 to be received by a clevis of the female insert 285 to connect the halves 210 and 220 together. The inserts 280 and 290 can be secured within their respective cavities 270 by adhesive bonding. At least one of the portions 210 and 220 includes an intake port shown as a short countersunk screw 290 for inserting lubrication fluid, such as oil into the spherical gap that forms the lubrication layer 140. Alternatively, the intake port can incorporate a self-sealing check-valve.

Figure 3:
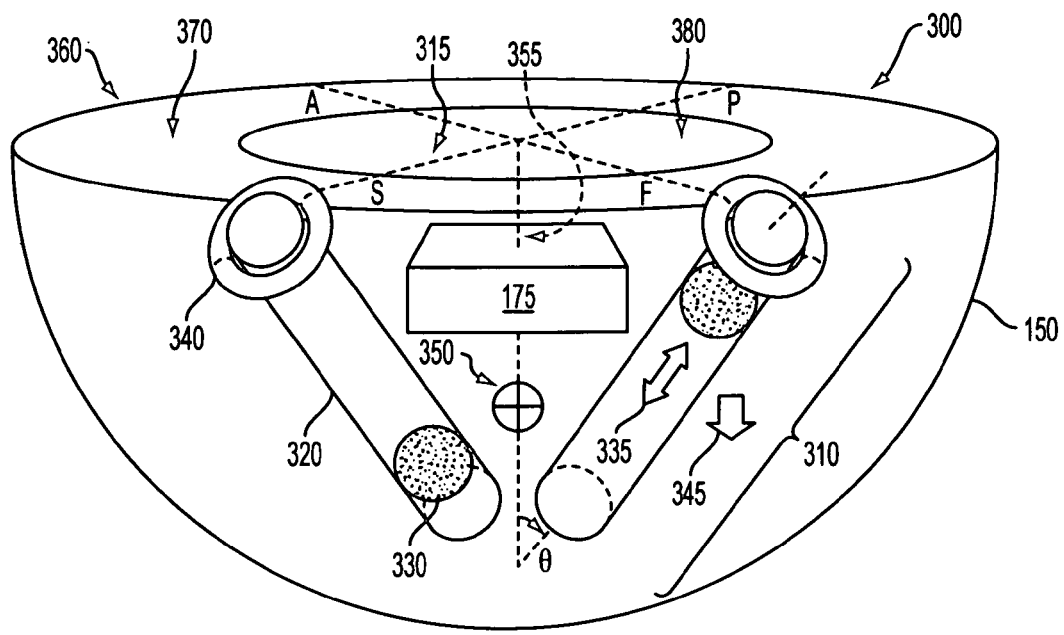
FIG. 3 is an isometric view of a lower module with cruciform weight-shifters.

FIG. 3 shows an isometric view 300 of the lower module 150. The plurality 170 of weight-shifters 310 can be disposed within the lower module 150 pointing upward and radially outward. In the configuration shown, a quartet of the weight-shifters 310 is arranged in a cruciform pattern 315 (as would be observable from above) labeled fore, aft, port and starboard (FAPS). Artisans of ordinary skill will recognize that four symmetrically arranged weight-shifters 310 represent merely a convenient description, whereas the plurality 170 can be configured to more or fewer such devices without departing from the scope of the invention.

Each weight-shifter 310 comprises a channel 320 along which an armature 330 (for example, a dense ball bearing) can travel along the direction arrow 335, and an electromagnet 340 to pull the armature 330 towards itself. The electromagnet 340 can constitute fine copper wire that wraps around an iron ring core. Alternatively, the weight-shifter 310 can employ a pulley attached to the armature 330 and pulled upward and radially outward by a stepper motor rather than the electromagnet 340.

As the armature 330 travels along arrow 335, its weight induces a downward force 345. The n-SMART 110 has a center-of-mass 350, which for a balanced inactive assembly lies along the vertical centerline 355. The force 345 displaced relative to the center-of-mass 350 produces a torque that causes the outer shell 120 to roll forward along the arrow 115, corresponding to the activated weight-shifter 310. Each channel 320 orients to diagonally rise from the bottom periphery near the centerline 355 to the lateral radial interface periphery 360 of the lower module 150 at a tilt angle θ from vertical of approximately ¼π rad or 45°, with the exemplary geometry being 42° in view 100.

The lower module 150 can be closed-cell polystyrene (e.g., Styrofoam™) or an aerogel for containing the weight-shifters 310 and the control assembly 175. Upon assemblage, the lower module 150 can be inserted into the lower dome 155, which would enable smooth interface with the interior of the outer shell 120. Alternatively, the lower module 150 and the lower dome 155 can substantially form an integrated unit by three-dimensional printing techniques to produce an encased honeycomb structure from thermoplastic filament for the cushioning interior to minimize weight while providing structural support of the weight-shifters 310 and other components. The volume of the lower module 150 is further defined by its upper surface 370 and a center cavity 380 in which the payload 180 can be inserted upon assemblage of the SMART 110.

Figure 4:
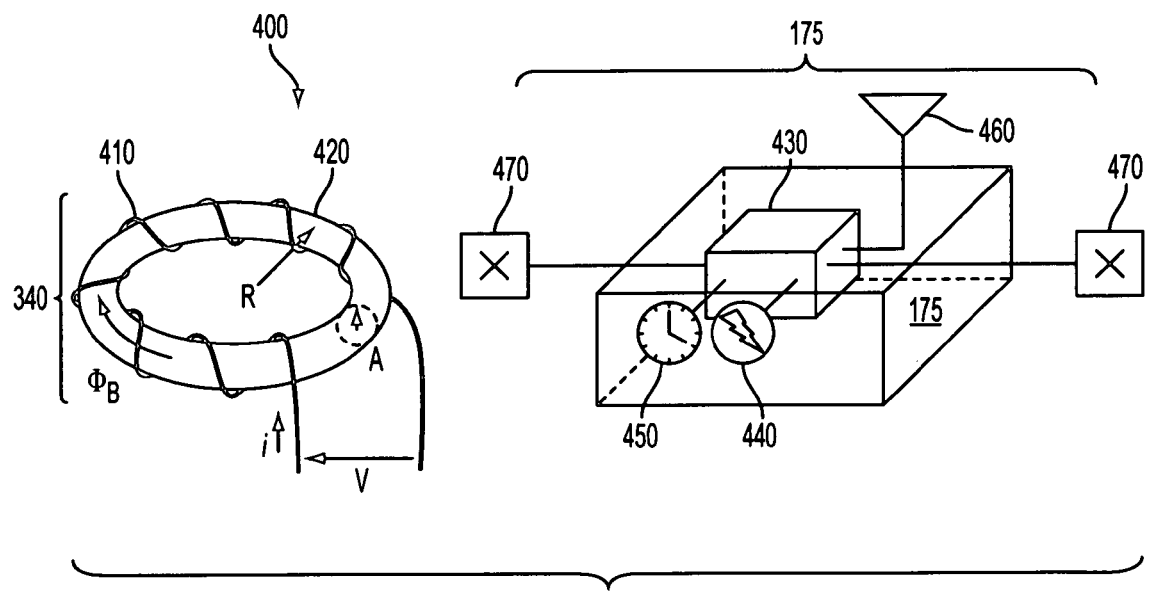
FIG. 4 is an isometric view of an electromagnet and associated control assembly.

FIG. 4 shows isometric views 400 of the electromagnet 340 and the control assembly 175. The electromagnet 340 in the weight-shifter 310 includes a wire coil 410 that wraps around a ferromagnetic core 420 having radius R and cross-section area A. Upon application of current i applied at voltage V, the electromagnet 340 produces a magnetic flux $\phi_B$. The electromagnet 340 can be activated by the control assembly 175 to controllably attract the actuator 330 and thereby shift the SMART's center of mass 350, thereby enabling movement in the direction of the center's shift. The control assembly 175 includes a processor 430 that connects to a power supply 440, and input triggers, such as a timer 450, a signal receiver 460 (e.g., antenna) and a sensor 470 (e.g., accelerometers).

The power supply 440 provides electrical current for the processor 430 and the electromagnets 340. Preferably, the sensors 470 constitute accelerometers to detect travel interruption in the direction of the activated weight-shifter 310. Such a condition indicates presence of an obstacle, hence to avoid the impediment to travel, the processor 430 can shift activation to an alternate electromagnet 340 within the cruciform pattern 315. The order of shifts can be based on a pre-selection sequence (e.g., FAPS), energizing durations, random pattern, or other criteria.

The channels 320 can have tubular cross-sections with corresponding spherical ball bearings as the armatures 330. Alternatively, the armatures 330 could be cylindrical roller bearings for sliding rather than rolling. At rest, the armatures 330 reside at the bottom of their respective channels 320 adjacent the center-of-mass 350 of the lower module 150. Upon activation, the electromagnet 340 pulls the corresponding armature 330 radially outward (and vertically upward) towards the radial periphery 360, thereby shifting the center-of-mass 350 in the direction of the weight-shifter 310 that corresponds to the active electromagnet 340. Upon deactivation, the armature 330 falls through its channel 320 returning to rest near the center-of-mass 350.

The armatures 330 can preferably be composed of a dense material, such as tungsten carbide (WC, density 15.63 g/cm$^3$) or alternatively depleted uranium metal (U, density 19.12 g/cm$^3$), with the armature 330 plated with a ferromagnetic material such as cobalt or iron by which to engage the electromagnet 340 when activated. For the exemplary sphere sizes considered, the armature 330 constitutes a WC ball bearing having a diameter of 0.7924 cm (0.312 inch), thus having a volume of 0.26059 cm$^3$ and corresponding mass of 4.073 g. The channel 320 of each weight-shifter 310 would have a circular cross-section of 0.8 cm diameter through which the armature 330 could roll within from the base of the channel 320 adjacent the center-of-mass 350 to the electromagnet 340 near the interface periphery 360 when activated. Raising the WC ball (against gravitation to its mass accelerated to 9.8 m/s) would require a force of F=mg of 0.040 N.

Upon deployment, the SMART 110 can initiate rolling motion in response to a command signal to the receiver 460 and/or to a pre-established clock event from the timer 450. Although initial and terminal commands can optionally be imposed on the SMART 110, the processor 430 enables autonomous locomotion via shifts in center-of-mass 350 independently of external instructions. Guidance can be provided by internal travel vector calculations (i.e., inertial guidance) and/or GPS receiver signals as to location relative to an intended target.

The processor 430 can activate the electromagnet 340 of a preselected or randomly assigned weight-shifter 310, such as among the FAPS in the cruciform pattern 315. The processor 430 can be configured to preclude concurrent activation of multiple weight-shifters 310. Alternatively, the processor 430 can be configured to enable near-simultaneous activation and release of all of the weight-shifters 310, causing the SMART 110 to "jump" upward slightly and thereby indicate kinematic arrival at its intended destination based on inertial navigation and/or GPS identified location. This accelerometer signal could be augmented by supplemental location information or timing delays or multiple jumps within a stipulated interval to override false activation indicators such as descent along stair steps.

By attracting the armature 330 to roll within the channel 320 towards the electromagnet 340, the center-of-mass 350 of the inner ball 120, and thus the SMART 110 shifts away from the neutral mass center and in the direction of the activated weight-shifter 310. Thereafter, the processor 430 can avoid obstacles by maneuvering with alternating weight-shifters 310 based on signals from the accelerometers among the sensors 470 and terminate upon some established condition, such as from the receiver 460 and/or the timer 450 to cease locomotion. The receiver 460 can alternatively receive information from the Global Positioning System (GPS) network to determine intended arrival. Alternatively, the processor 430 can operate based on pre-programmed event scheduling based on the timer 450 and negotiate a route to its destination by inertial navigation.

Figure 5:
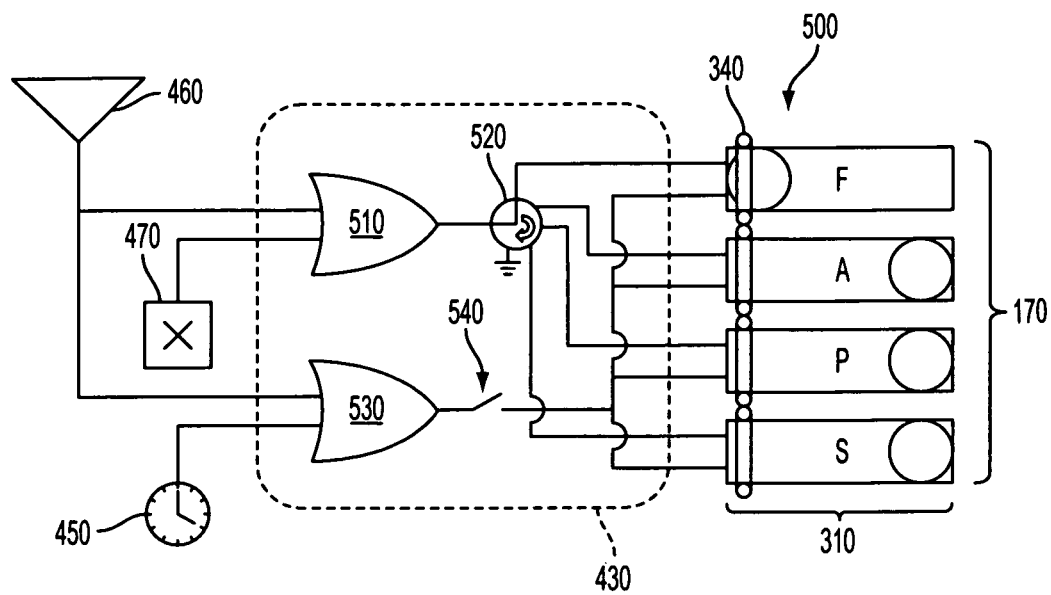
FIG. 5 is a logic diagram view of electromagnet activation switches.

FIG. 5 shows a schematic view 500 of the processor 430 in the control assembly 175. The processor 430 includes a first .OR. gate 510 connected to a selection switch 520 shown in contact with the fore weight-shifter 310, with additional options by rotation including the other weight-shifters 310 and as well as a fixed potential known as ground. For example, the .OR. gate 510 responds to input signals from the receiver 460 and/or the sensor 470 to reset the selection switch 520 in response to an event or condition from these input components. The selection switch 520 can optionally select from among the plurality 170 of FAPS configured weight-shifters 310 as to which electromagnet 340 to energize by closing that selected circuit path.

Alternating among the weight-shifters 310 via the selection switch 520 enables the SMART 110 to maneuver by change in direction, inactivating the prior activated electromagnet 340 to a subsequent electromagnet 340. The processor 430 can also include a second .OR. gate 510 connected to a single pole switch 540, set to be open by default. The .OR. gate 530 receives input signals from the receiver 460 and/or the timer 450 in response to a condition, such as designated arrival at the intended target, and thereby closes the switch 540 to activate all the electromagnets 340 to initiate the jump.

Figure 6:
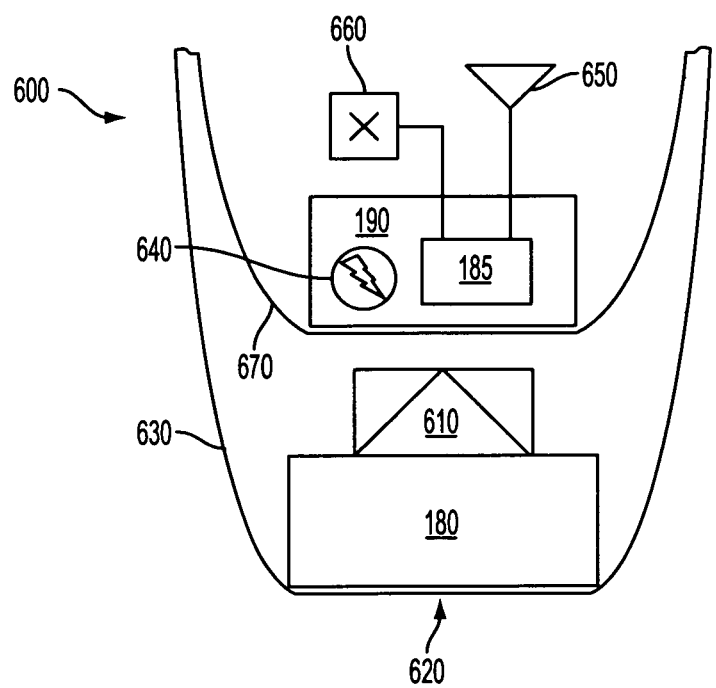
FIG. 6 is an elevation view of upper module components.

FIG. 6 shows an elevation view 600 of components for the upper module 150. The payload 180 can include a charge for detonation and/or distraction and be initiated by the trigger 185. For detonation, the payload 180 can constitute either high explosive for wide dispersal or else include a shaped charge 610 (e.g., inverted cone) for armor penetration from underneath. The upper module 160 can constitute a lightweight cradle 620 to contain the payload 180 disposed by suspension components 630 such as straps. The payload 180 thus can be secured above the lower module 150 upon integrated assembly. As an alternative to suspension components 630, the upper module 160 and its associated upper shell 165 can be formed as a unitary component as an encased honeycomb matrix produced by three-dimensional printing techniques.

The trigger 185 can be activated by a power supply 640 via signals from a receiver 650 or a sensor 660. In particular, the receiver 640 can include a GPS location indicator or an activation command; and the sensor 650 can constitute an accelerometer oriented for vertical motion to detect the jump by the lower module 150. The housing 190 can be supported by auxiliary suspension straps 670. The suspension components 630 can be ribbons that extend through the cradle 620 and secured in tension about the payload 180 within the cavity 380 upon assembly. The upper dome 165 preferably enables a smooth interface with the interior of the outer shell 120 to minimize friction between rolling and static components. Optionally, the payload 180 can be enveloped by polystyrene to restrict lateral movement within the upper module 160.

Figure 7:
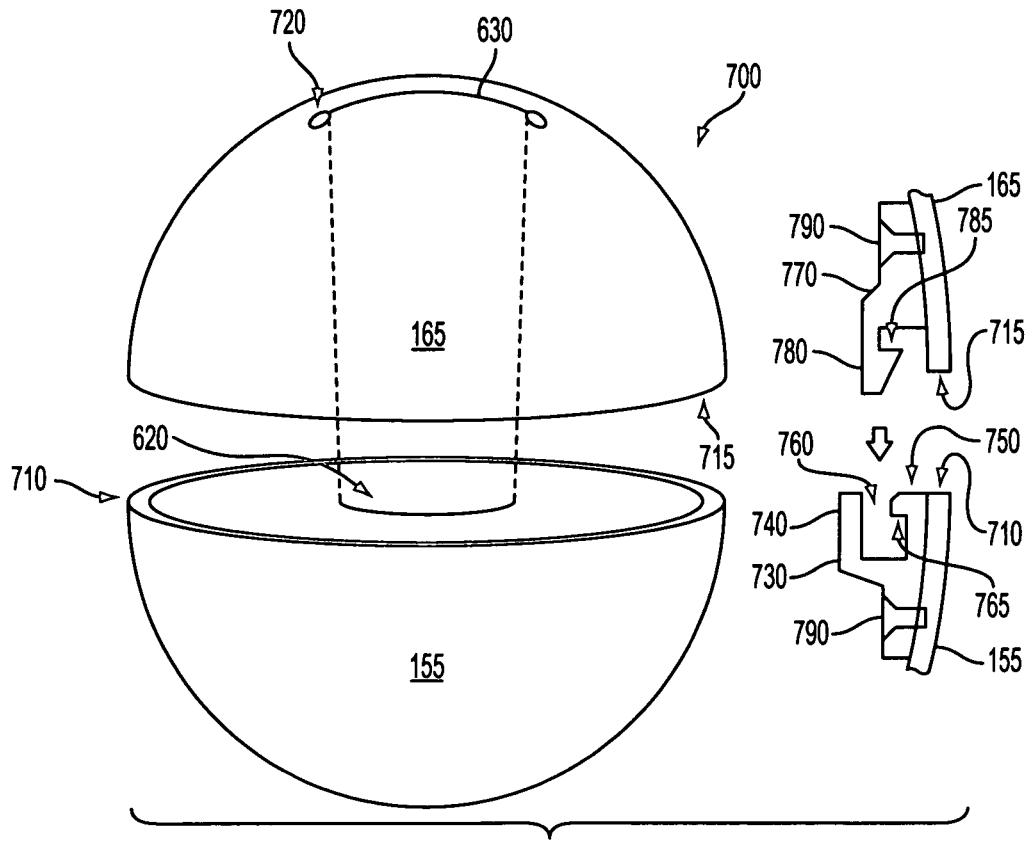
FIG. 7 is an isometric view of dome components, and an elevation cross-section view of dome fasteners.

FIG. 7 shows an exploded isometric view 700 of the domes 155 and 165 for the respective lower and upper modules 150 and 160, as well as an adjacent elevation cross-section view of fasteners for these domes. Mechanical connection of the domes 155 and 165 together can eschew electrical interferences because of the independence of the modules 150 and 160. The domes 155 and 165 preferably constitute symmetrical half-spheres.

The lower dome 155 presents an interface opening for receiving the lower module 150 defined by a lower rim 710. Similarly, the upper dome 165 presents an interface opening for receiving the upper module 160 defined by an upper rim 715. The upper dome 165 structurally maintains the payload 180 by fasteners, such as straps 620 that pass through holes 720 along the top of and into (depicted by dash lines) the upper dome 165. In an exemplary embodiment, the lower dome 155 includes slots or holes 730 to support the cradle 620.

As shown, the lower dome 155 includes a clevis fastener 730 including a cantilever flange 740 and a jaw 750 that define a recess 760. A ledge 765 provides an obstacle platform for the recess 760. The upper dome 165 includes a tang fastener 770 with a prong 780 that wedges axially into the recess 760. The prong 780 has a tip sufficiently flexible to pass between the flange 740 and the jaw 750 into the recess 760 along the arrow direction, and includes a terminal lip 785 that upon insertion into the recess 760 abuts the ledge 765 to inhibit removal. The clevis and tang fasteners 730 and 770 present complementary snap together counterparts with their respective recess 760 and prong 780 for securing the domes 155 and 165 to each other.

The domes 155 and 165 can be fabricated from an appropriate rigid material such as a ceramic (e.g., magnesium fluoride $MgF_2$—density 3.148 g/cm$^3$), metal alloy (e.g., aluminum 6061—density 2.70 g/cm$^3$) or thermoset plastic (e.g., polyethylene terephthalate $(C_{10}H_8O_4)_n$ also known as polyester—density 1.38 g/cm$^3$). For inner ball 130 components stamped from sheet metal (providing inclusion of transmission windows to permit radio signals to enter), the clevis and tang fasteners 730 and 770 can be secured to their respective domes 155 and 165 by attachment mechanisms, such as shallow countersunk screws 790. Alternatively, the fasteners 730 and 770 can be incorporated directly in fabrication, such as by injection molding. In other exemplary embodiments, the snap fasteners can be oriented angularly so that the prong 780 inserts into the recess 760 and rotated to lock the mechanism assembly.

Complementary fasteners 730 and 770 can be angularly distributed along the respective interior surface of the rims 710 and 715, while avoiding interference from their radially inward protrusion to the weight-shifters 310. The arrangement of the fasteners 730 and 770 can be uniformly designated for respective domes 155 and 165, or in alternation by complementary pairs along each rim for mutual alignment. Depending on whether the fasteners 730 and 770 have flanking walls on one or both sides of the recess 760, the domes 155 and 165 can be permitted to be rotated relative to each other to release them, or precluded from such an option.

For a croquet size device, the outer shell 120 has an outer radius of 4.6 cm. Assuming a thickness of 0.12 cm, the inner radius would be 4.48 cm for a total material volume of 31.1 cm$^3$. Composed of polyester, the outer shell 120 would have a mass of 42.9 g and a thin-sphere moment of inertia of $I=\frac{2}{3}m \cdot R^2$, where m is mass and R is average radius to yield 5.90E-5 kg-m$^2$. An exemplary inner ball 130 could have respective outer and inner radii of 4.43 cm and 4.30 cm for a total material volume of 28.7 cm$^3$. Composed of polyester, the inner ball 130 would have a mass of 39.6 g and a moment of inertia of 5.03E-5 kg-m$^2$. Assuming a cylindrical explosive with a radius of 2.0 cm and height of 2.0 cm, the payload has a volume of 25.1 cm$^3$. Using HMX for an explosive with a density of 1.91 g/cm$^3$, the mass of the payload 180 can be estimated at 48.0 g.

Using the 4.073 g WC ball bearing as the armature 330 requires a lifting force of 0.040 N. Electromagnetic force can be quantified by the solenoid relation $F=(N \cdot i)^2 \mu_0 \cdot A/(2L^2)$, where N is number of wire turns around the core, i is the current, $\mu_0=47E-7$ N/A is permeability, A is cross-section area and L is length gap between the armature 330 and the electromagnet 340. For purposes of exemplary embodiments, current is taken as 3.6 A supplied by six 9-V batteries arranged in parallel for the power supply 440, and length gap is 5 cm (0.05 m). A typical 9-V battery has a mass of 45 g.

For 500 turns using 36-gauge wire (rated at 4 A) winding 78.7 turns-per-centimeter, the exemplary electromagnet 340 would have a core perimeter of 6.353 cm, which can be converted to a toroidal coil of 2.02 cm for inner diameter. The cross-section area can be estimated at 0.5 cm$^2$ (5E-5 m$^2$) based on a core diameter of 0.8 cm. (The inner core dimension together with the cross-section indicates the core radius of 1.42 cm for view 400.) This yields solenoid force of F=0.041 N adequate to elevate the armature 330. Alternatively, a cascade of electromagnets 340 could be disposed along the length of the channel 320 with successive electromagnets 340 raising the armature 330 sequentially. Such design would entail additional control logic by the processor 430 to avoid excess drain on the power supply 440.

The exemplary electromagnets 340 would have an approximate mass of 25 g each and provide a moment of inertia estimated at 6.0E-5 kg-m$^2$. At rest, the armatures 330 would have a negligible moment, being disposed near the center-of-mass 350. The payload 180 (48 g) and batteries 440 (270 g) plus other components can be estimated as having a mass of 500 g distributed about 2 cm in radius and along a height of about 3 cm, with a corresponding cylindrical moment of 8.7E-5 kg-m. Total moment of the SMART 110 can thus be estimated based on the outer shell, the inner ball and internal components as about 2.6E-4 kg-m$^2$.

A single activated armature 330 would induce a moment of about 70 g-cm$^2$ (7.0E-6 kg-m$^2$). The torque produced by the internal mass shift within the lower module 150 can be expressed as $T=L \cdot F \cdot \sin(\theta)=I \cdot \alpha$, where L is travel length along the channel 320, F is the force applied by the armature 330 upon activation of the electromagnet 340, $\theta$ is the tilt angle, I is total moment of inertia and $\alpha$ is angular acceleration.

For the exemplary n-SMART configuration, force constitutes armature mass of 0.004 kg multiplied by gravitational acceleration of 9.8 m/s$^2$ yielding 0.04 N (as described earlier for raising the armature), length is about 5 cm, and tilt angle $\theta$ is about 42°. This produces a torque of 1.3E-3 N-m. With total moment estimated to be 2.6E-4 kg-m$^2$, this yields an angular acceleration of about 5 rad/s$^2$.

Continuous acceleration for 2.0 s yields an instantaneous radial speed of 10 rad/s or 1.59 revolutions-per-second. With a diameter of 9.2 cm, the outer shell 120 has a circumference of 28.9 cm and thus within two seconds could travel 0.23 m at a speed of 0.46 m/s. Assuming continuous acceleration were achievable with an available power supply 440, the SMART 110 could reach highway travel speed of 100 km/hr (27.7 m/s) within 35 s on a smooth surface.

Figure 8:
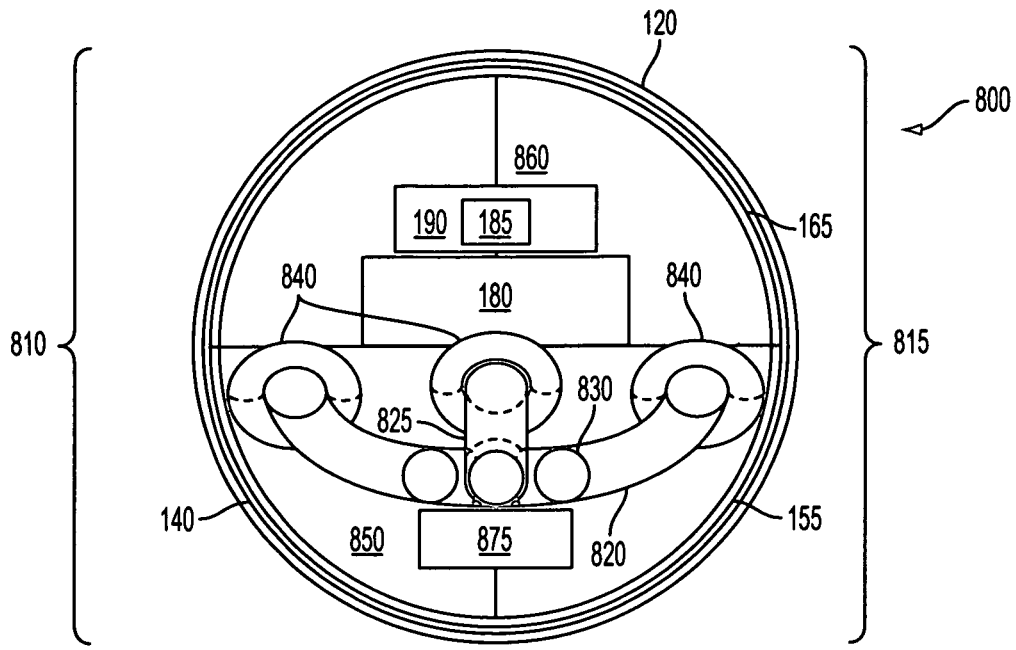
FIG. 8 is an elevation view of a biased spherical traveler assembly.

FIG. 8 shows an elevation cross-section view 800 of an exemplary bias SMART 810 for travel forward relative to the view 800, as an alternative to the cruciform weight-shifter configuration for the n-SMART 110. The b-SMART 810 includes the same outer shell 120, lubrication layer 140, cases 155 and 156, payload 180, trigger 185 and housing 190 as the n-SMART 110.

The cases 155 and 156 contain an inner ball 815 that includes weight-shifter assemblies. These include flanking lateral channels 820 and a radial channel 825 in which armatures 830 roll, and electromagnets 840 at the distal ends of the channels 820 and 825. The armatures 830 can constitute WC ball bearings, and the electromagnets 840 can be substantially similar to their n-SMART counterparts 340, albeit with potentially distinctive physical characteristics and performance.

The channels 820 and 825 have substantially circular cross-sections as their n-SMART counterpart 320. The weight-shifting assemblies are contained within a lower module 850, and the payload 180, trigger 185 and housing 190 are contained in an upper module 860. A control assembly 875 can be contained within the lower module 850. The modules 850 and 860 can be combined with their respective cases 155 and 165 composed of thermoplastic with honeycomb interior by three-dimensional printing techniques.

Figure 9:
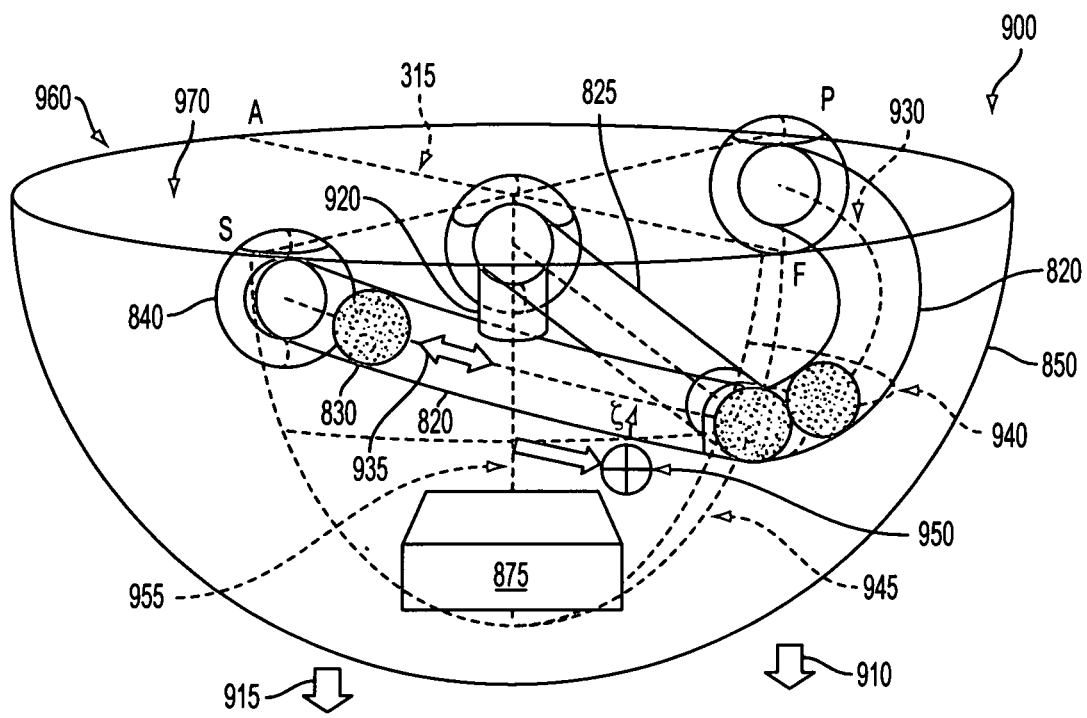
FIG. 9 is an isometric view of a lower module with lateral weight-shifters.

FIG. 9 shows an isometric view 900 of the lower module 850. Orientation of the lower module 850 can be described by the pattern 315. Unlike the n-SMART lower module 150 with the armatures 330 at rest adjacent to the center-of-mass 350, the b-SMART lower module 850 positions three armatures 830 adjacent the lower case 155, thereby imposing a weighting force downward by arrow 910, thereby inducing forward motion of the b-SMART 810 while at rest, i.e., with no electromagnets 840 turned on. Upon activation of the starboard electromagnet 840, the closest armature 830 rolls within peripheral channel 820 curving toward starboard, thereby imposing a weighting force downward 915. The radial channel 825 terminates at the cruciform center with a vertical shaft cavity 920 to receive armatures 830.

The lateral channels 820 extend from their bases to the starboard and port sides along travel lines 930, with the armatures 830 moving along direction arrow 935 oriented upward from a mid-latitude arc 940 by a slope angle of about 10°. The bases of the channels 820 and 825 join at an intersection ζ along the mid-latitude arc 940 and a forward longitude 945, adjacent the periphery of the lower case 155 (upon assembly).

The armatures 830 at the base of the channels 820 bias the assembly's center-of-mass 950 forward from the vertical centerline 955. The starboard and port channels 820 terminate adjacent a radial periphery 960 of the lower module 850. The electromagnets 840 are disposed proximate to an interface surface 970 of the lower module 850. Activation of either the starboard or port electromagnet 840 causes the most proximate armature 830 towards its corresponding side to respectively initiate a right or left turn. The control assembly 875 for the b-SMART 810 provides similar actuation initiation for the electromagnets 840, as well as navigation commands, as described for the control assembly 175 for the n-SMART 110.

By contrast, activation of the center electromagnet 840 reduces distance between the center-of-mass 950 from the centerline 955 via individually rolling the armatures 830 through the radial channel 825 and into the cavity 920 for repository. Whereas the n-SMART 110 employs weight-shifters 310 in cruciform configuration, the peripherally extending channels 820 define operation of the b-SMART 810.

For the alternate b-SMART configuration, the three armatures 830 produce a moment of about 200 g-cm$^2$ (2.0E-6 kg/m$^2$) while the electromagnets 840 remain inert. For triple armature mass of 0.012 kg yields a force of 0.12 N over a radial length of about 3.5 cm from the centerline 955 yielding a torque of about 4.2E-3 N-m. The same assembly moment of about 2.6E-4 kg-m$^2$ results in an angular acceleration of about 16 rad/s$^2$, thereby enabling higher acceleration, albeit with reduced ability to remain stationary.

While certain features of the embodiments of the invention have been illustrated as described herein, many modifications, substitutions, changes and equivalents will now occur to those skilled in the art. The afore-described dimensions and mass properties constitute an example to demonstrate a practical utility and are not limiting. It is, therefore, to be understood that the appended claims are intended to cover all such modifications and changes as fall within the true spirit of the embodiments.

What is claimed is:

1. A spherical modular autonomous robotic traveler (SMART) for delivering a payload along a surface from a first position to a second position, said SMART comprising:
   an outer spherical shell for rolling along the surface;
   an inner spherical chamber disposed within said outer shell to carry the payload, said chamber maintaining its orientation relative to the surface;
   a plurality of weight-shifters arranged within said inner chamber, each weight-shifter including a mass disposed in a default position, and locatable to an active position in response to activation; and
   a controller within said inner chamber for selectively activating a weight-shifter among said plurality to shift said mass from said default position to said active position, wherein said outer shell rolls in a direction that corresponds to said weight-shifter activated by said controller.

2. The SMART according to claim 1, further comprising a lubrication layer interposed between said outer shell and said inner chamber.

3. The SMART according to claim 1, wherein said controller responds to an initiation signal from at least one of a receiver, an accelerometer and a timer.

4. The SMART according to claim 3, wherein said controller switches activation to several weight-shifters of said plurality in response to said initiation signal, such as upon reaching the second position.

5. The SMART according to claim 3, wherein said controller switches activation from a first weight-shifter to a second weight-shifter in response to said initiation signal.

6. The SMART according to claim 1, wherein said plurality of weight-shifters is symmetrical about a vertical centerline, and said default position for said each weight-shifter is adjacent radial periphery of said inner chamber.

7. The SMART according to claim 6, wherein said plurality of weight-shifters is arranged in a cruciform pattern.

8. The SMART according to claim 1, wherein said inner chamber comprises a lower dome that includes said plurality of weight-shifters and said controller, and an upper dome that includes the payload, said lower and upper domes being attachable together.

9. The SMART according to claim 1, wherein said plurality of weight-shifters is asymmetrical about a vertical centerline, and said default position for said each weight-shifter is adjacent a radial periphery of said inner chamber.

10. The SMART according to claim 1, wherein said controller responds to an accelerometer within said chamber.

11. A spherical modular autonomous robotic traveler (SMART) for delivering a payload along a surface from a first position to a second position, said SMART comprising:
- an outer spherical shell for rolling along the surface;
- an inner spherical chamber disposed within said outer shell to carry the payload, said chamber maintaining its orientation relative to the surface;
- a plurality of weight-shifters arranged within said inner chamber; and
- a controller within said inner chamber for selectively activating a weight-shifter among said plurality, wherein said outer shell rolls in a direction that corresponds to said weight-shifter activated by said controller, wherein said plurality of weight-shifters is symmetrical about a vertical centerline being arranged in a cruciform pattern, and each said weight-shifter includes:
- a channel containing an armature, said channel being oriented from bottom periphery to lateral radial periphery of said inner chamber; and
- an electromagnet activated by said controller, said electromagnet being disposed proximal to said channel at said lateral radial periphery, wherein
- said armature travels from said bottom periphery within said channel to said lateral radial periphery upon activation of said electromagnet.

12. The SMART according to claim 11, wherein said armature is a tungsten carbide ball bearing coated with a ferromagnetic material.

13. The SMART according to claim 11, wherein said chamber further includes a power supply for energizing said electromagnet that is activated by said controller.

14. A spherical modular autonomous robotic traveler (SMART) for delivering a payload along a surface from a first position to a second position, said SMART comprising:
- an outer spherical shell for rolling along the surface;
- an inner spherical chamber disposed within said outer shell to carry the payload, said chamber maintaining its orientation relative to the surface;
- a plurality of weight-shifters arranged within said inner chamber; and
- a controller within said inner chamber for selectively activating a weight-shifter among said plurality, wherein said outer shell rolls in a direction that corresponds to said weight-shifter activated by said controller, and said lower and upper domes include honeycomb cells to structurally support said weight-shifters, controller and payload.

15. The SMART according to claim 14, wherein said controller responds to an accelerometer within said chamber.

16. A spherical modular autonomous robotic traveler (SMART) for delivering a payload along a surface from a first position to a second position, said SMART comprising:
- an outer spherical shell for rolling along the surface;
- an inner spherical chamber disposed within said outer shell to carry the payload, said chamber maintaining its orientation relative to the surface;
- a plurality of weight-shifters arranged within said inner chamber; and
- a controller within said inner chamber for selectively activating a weight-shifter among said plurality, wherein said outer shell rolls in a direction that corresponds to said weight-shifter activated by said controller, wherein said plurality of weight-shifters is asymmetrical about a vertical centerline and comprises:
- a peripheral weight-shifter including a peripheral channel containing a first armature, said peripheral channel being oriented from a forward periphery of said inner chamber toward a circumferential periphery of said inner chamber along a peripheral incline;
- a radial weight-shifter including a radial channel containing a second armature, said radial channel being oriented from said forward periphery toward an interior location of said inner chamber along a radial incline; and
- first and second electromagnets activated by said controller, said first electromagnet being disposed adjacent said circumferential periphery, and said second electromagnet being disposed adjacent said interior location, wherein
- said first armature travels from said forward periphery within said peripheral channel to said circumferential periphery upon activation of said first electromagnet and
- said second armature travels from said forward periphery within said radial channel to said interior location upon activation of said second electromagnet.

17. The SMART according to claim 16, wherein said peripheral weight-shifter further includes port and starboard peripheral weight-shifters, with said circumferential channel corresponding to port and starboard leading channels, and said first electromagnet-respectively corresponding to port and starboard electromagnets.

18. The SMART according to claim 16, wherein said interior location includes a repository for at least one armature.

19. The SMART according to claim 16, wherein said armature is a tungsten carbide ball bearing coated with a ferromagnetic material.

20. The SMART according to claim 16, wherein said chamber further includes a power supply for energizing said electromagnet that is activated by said controller.

\* \* \* \* \*